Oct. 24, 1939.  H. J. DE N. McCOLLUM ET AL  2,177,114
AUTOMOBILE HEATER
Filed Jan. 14, 1937   2 Sheets-Sheet 1
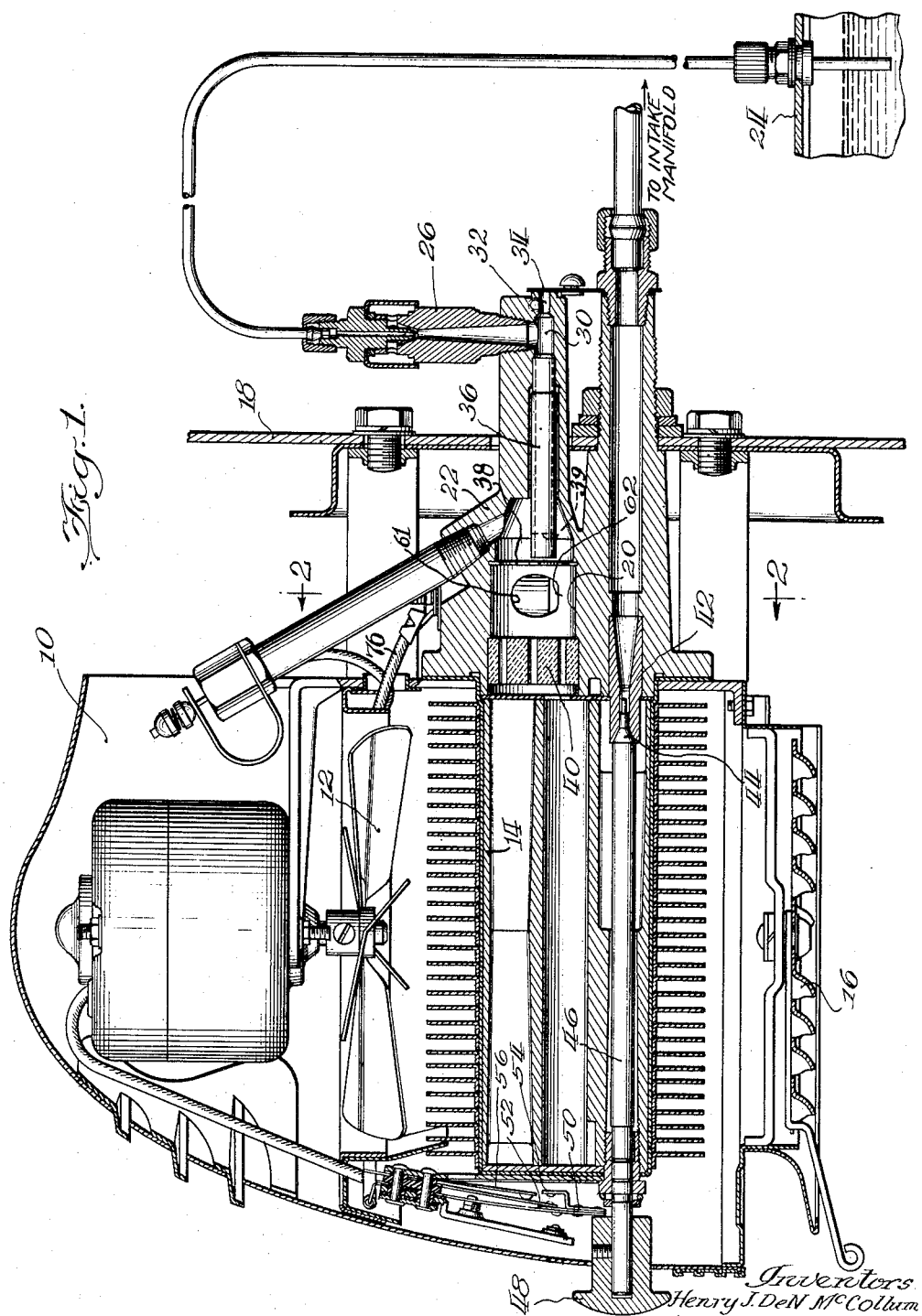
Inventors
Henry J. DeN McCollum
Thomas F. Spackman
By Williams, Bradbury, McCaleb & Hinkle
Attys.

Oct. 24, 1939.  H. J. DE N. McCOLLUM ET AL  2,177,114
AUTOMOBILE HEATER
Filed Jan. 14, 1937   2 Sheets-Sheet 2
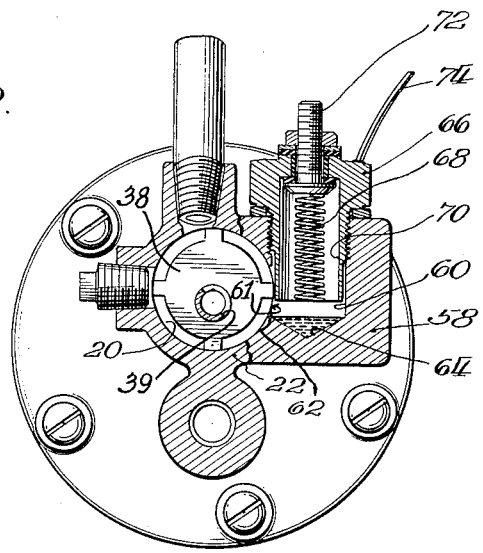
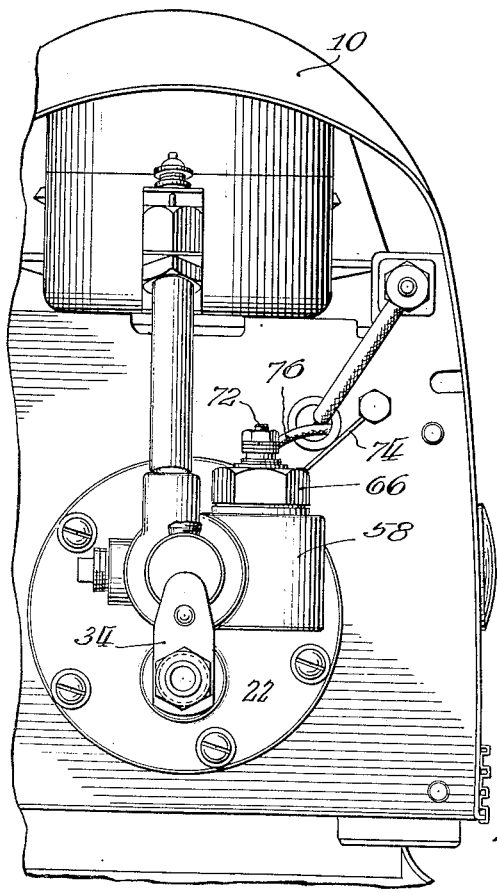
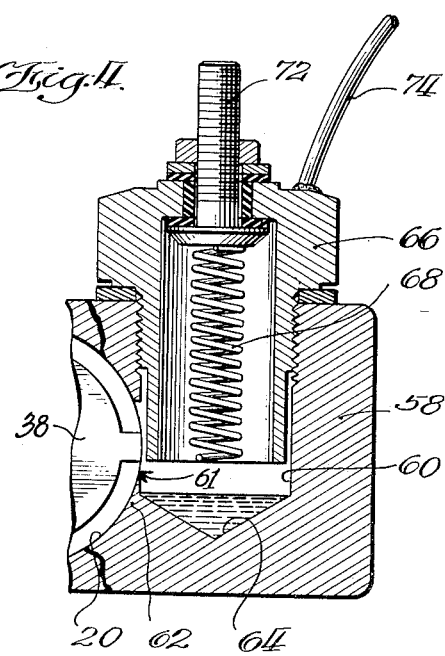
Inventors.
Henry J. DeN. McCollum
Thomas F. Spackman
By
Williams, Bradbury, McCaleb & Hinkle
Attys.

Patented Oct. 24, 1939

2,177,114

UNITED STATES PATENT OFFICE 2,177,114

AUTOMOBILE HEATER

Henry J. De N. McCollum, Evanston, and Thomas F. Spackman, Chicago, Ill.; said Spackman assignor to Stewart-Warner Corporation, a corporation of Virginia Application January 14, 1937, Serial No. 120,522

4 Claims. (Cl. 158—28)

This invention relates generally to automobile heaters and more particularly to improvements in the means for igniting automobile heaters of the internal combustion type.

In internal combustion automobile heaters of the type disclosed in the application of Henry J. De N. McCollum, Serial No. 61,213, filed January 28, 1936, some difficulty has been experienced in starting the heater at extremely low temperatures, and we have discovered that this difficulty could be overcome by placing the igniter at the side of the combustion chamber and providing it with a shallow well for the accumulation of the liquid fuel. The heat generated by the igniter may, therefore, be concentrated on a stationary mass of liquid fuel and therefore be effective in vaporizing this fuel and raising the temperature of the vapor above its kindling temperature.

It is thus an object of our invention to provide an improved means for igniting the flame in the combustion chamber of an automobile heater which will operate reliably at lowest temperatures encountered in practical use of the heater.

A further object is to provide an igniter for automobile heaters of the internal combustion type in which ignition will take place rapidly and the consumption of current by the igniter reduced to a minimum.

Other objects will appear from the following description, reference being had to the accompanying drawings, in which:

Fig. 1 is a vertical sectional view of the heater showing our improved combustion chamber and igniter arrangement;

Fig. 2 is a broken transverse sectional view taken generally on the line 2—2 of Fig. 1;

Fig. 3 is a rear elevational view of the combustion chamber of the heater; and

Fig. 4 is an enlarged sectional view similar to Fig. 2, showing the details of the igniter and its well.

The heater of our invention comprises generally a casing 10 in which is mounted a motor driven fan 12 which circulates air past a radiator 14 to force the heated air to the passenger compartment of the automobile past a deflector 16. The casing 10 is suitably secured to the dashboard 18 of the automotive vehicle and the radiator 14 is provided with internal passageways to receive heated gases of combustion from a combustion chamber casting 22. The liquid fuel is supplied from a suitable source such as the top of the float bowl of the carburetor 24 of the internal combustion engine of the vehicle, and is mixed with air in a small auxiliary carburetor 26 which discharges into a bore 30 formed in the combustion chamber casting 22. An auxiliary air inlet 32 is controlled by a bi-metal thermostatic valve element 34 so that additional air may be admitted to the mixture of fuel and air received from the carburetor 26 whenever the heater is in full, steady operation. This feature is more fully disclosed and claimed in the co-pending application of Henry J. De N. McCollum, Serial No. 177,075, filed November 29, 1937.

The mixture of fuel and air supplied to the bore 30 is fed through a pre-heating tube 36 into the combustion chamber 20, being projected against a baffle 38 positioned in the combustion chamber. The outlet end of the tube 36 is cut away as indicated at 39 in Figs. 1 and 2, so that the major portion of the mixture of fuel and air will be directed toward the right side wall (Fig. 2) of the combustion chamber, thus insuring a copious supply of liquid fuel to the igniter well. The charge in the combustion chamber is ignited in a manner which will be more fully set forth hereinafter and passes through suitable passageways formed in a ceramic re-igniter 40 which forms one wall of the combustion chamber and then through the passageways formed in the radiator 14 to a Venturi nozzle 42 which compensates for variations in the degree of vacuum produced in the intake manifold of the internal combustion engine of the vehicle.

Flow through the compensator nozzle 42 is controlled by a manually operable valve 44 engageable with the flaring mouth of the nozzle, the valve having a stem 46, with a handle button 48 secured at its outer end. The button 48 is engageable with one arm 50 of a contact switch which controls the flow of current from the battery of the vehicle to the motor of the fan 12 and to the electrical igniter. The current to the igniter is controlled by a pair of contacts 52, 54, which are closed due to the resiliency of the contact arm 50 whenever the button 48 is pulled outwardly to open the valve 44 and initiate operation of the heater. A thermostatic element 56 will, when heated to a predetermined temperature, break the contact between the contact members 52 and 54 and thus interrupt the supply of current to the electrical igniter. This occurs when the radiator of the heater has been raised substantially to its normal operating temperature. If the temperature should drop due to the extinguishment of the heater, the thermostatic element 56 would be moved in the opposite direction to permit reengagement of the contacts 52, 54 and reestablishment of the circuit to the electrical igniter. This control switch and associated means is not a part of our present invention, but is more fully disclosed and claimed in the co-pending application of Henry J. De N. McCollum, Serial No. 120,523, filed Jan. 14, 1937.

As best shown in Figs. 2, 3 and 4, the combustion chamber casting 22 is provided with a sidewardly extending boss 58 which is drilled to form a bore 60 intersecting in part the bore of the combustion chamber 20. The axes of the bores 20 and 60 are, of course, at right angles to each other and are spaced sufficiently that an opening 61 and a ridge 62 will be formed between the two bores and thereby provide a well 64 at the lower end of the bore 60. The upper end of the bore 60 is tapped to receive an igniter block 66. A high resistance wire 68 is coiled within the bore 70 formed in the igniter block 66 and has one end silver-soldered, welded, or otherwise suitably secured to the lower end of the block 66 and its upper end welded to a terminal stud 72 which is suitably insulated from the block 66. A wire 74 is preferably silver-soldered or welded to the igniter block 66 and grounded, thereby to assure an adequate ground connection for the igniter. The stud 72 is connected by a suitable conductor 76 to the contact 52 of the switch.

During the starting of the heater, upon opening valve 44, some liquid gasoline will be drawn into the combustion chamber 20, and before ignition takes place, some of this gasoline will collect in the well 64 as shown in Fig. 4. This gasoline will be subjected directly to the radiant heat of the igniter and to heat conducted from the coil 68 of the igniter to the boss 58. The gasoline contained in the well will therefore be rapidly vaporized and heated to its kindling temperature, whereupon the ignited gases will be discharged into the combustion chamber 20 and result in the ignition of the main incoming supply of combustible mixture of gasoline and air.

After combustion has been started, the ceramic plug 40 will become heated and aid in maintaining the flame. A short time after the heater has been started, the bi-metal thermostat 56 will become heated sufficiently to break the contacts 52, 54, thus cutting off the supply of current to the igniter 68, and as more fully disclosed in said application Serial No. 120,523, the circuit to the motor of the fan 12 will be completed and the air in the passenger compartment of the vehicle circulated past the radiator. When it is desired to turn off the heater, the knob 48 is pushed inwardly to the position in which it is shown in Fig. 1, whereupon the valve 44 closes the inlet to the nozzle 42, and the switches for the igniter and fan motor held open.

With the arrangement of igniter chamber and combustion chamber as herein disclosed, we have found that the fuel charge will be ignited in a much shorter time than in constructions previously used. It is, of course, of considerable advantage to reduce to the minimum the time required to ignite the combustible mixture so as to lower as much as possible the amount of current which is drawn from the storage battery of the vehicle.

While we have shown and described a particular embodiment of our invention as used in a heater of a particular construction, it will be apparent to those skilled in the art that the essential features of our invention may be embodied in other forms and be used in conjunction with heating apparatus of different construction. We therefore desire that the following claims shall not be limited to the particular construction shown, but shall include similar devices, wherein substantially the same results are secured by substantially the same means.

We claim:

1. In a liquid fuel burning heater of the internal combustion type, the combination of a horizontal generally cylindrical chamber, an igniter chamber extending perpendicular to said combustion chamber and intersecting the latter to form a relatively large opening connecting said chambers, an igniter plug having a hollow cylindrical skirt portion secured in said igniter chamber, a helical coil of resistance wire having one end secured to said plug, a terminal element secured to said plug and insulated therefrom and connected to the other end of said resistance wire, means to supply current to said resistance wire to heat the latter to a high temperature, and a recess in said igniter chamber adjacent to said resistance wire in position to receive a large proportion of the heat generated in said wire, whereby liquid fuel in said recess may quickly be raised to a temperature sufficiently high to vaporize and ignite the fuel.

2. In a heater of the liquid fuel burning internal combustion type, the combination of a combustion chamber, suction means for drawing a combustible mixture of liquid fuel and air into said chamber, a vertical igniter chamber adjacent said combustion chamber and in open communication therewith, said igniter chamber being located at the side of the path of flow of the mixture through said combustion chamber, a coil of resistance wire located in said igniter chamber, means to supply current to said resistance wire to heat the latter to a high temperature, and a well at the bottom of said igniter chamber for receiving liquid fuel from said combustion chamber, said well being so located with respect to said coiled resistance wire that heat radiated from the latter will be concentrated upon the liquid fuel in the well and that heat from said wire will be conducted through the wall of said igniter chamber to said well, thereby to aid in rapidly vaporizing the liquid fuel therein and raising the vapor to its kindling temperature.

3. A combustion and igniter chamber casting having two bores therein perpendicular to one another and having their axes spaced a distance such that said bores intersect to form a relatively large opening, means for causing flow of a combustible mixture of liquid fuel and air longitudinally through one of said bores forming the combustion chamber, an electrically heated high resistance wire located in the other of said bores, said latter bore forming an igniter chamber, and a well in said igniter chamber arranged to receive liquid fuel from said combustion chamber, said well being located adjacent said resistance wire so as to receive a large proportion of the heat generated thereby and rapidly to vaporize and ignite said fuel, thereby to ignite the combustible mixture flowing into said combustion chamber.

4. In an automobile heater of the internal combustion type, the combination of a horizontally extending substantially cylindrical combustion chamber, a vertical bore intersecting the wall of said combustion chamber, an igniter secured in said vertical bore and having a high resistance igniter element located above the lower edge of the opening between said combustion chamber and said vertical bore, and means for supplying current to said igniter, thereby to heat and vaporize liquid fuel in the lower end of said vertical bore and to raise it to its kindling temperature.

HENRY J. DE N. McCOLLUM.
THOMAS F. SPACKMAN.